United States Patent
Lim et al.

(10) Patent No.: US 11,184,930 B2
(45) Date of Patent: Nov. 23, 2021

(54) SYSTEMS AND METHOD FOR SELECTING CARRIER RESOURCES FOR NARROWBAND PHYSICAL RANDOM ACCESS CHANNEL PROCEDURES

(71) Applicant: Apple Inc., Cupertino, CA (US)

(72) Inventors: Seau Lim, Swindon (GB); Marta Martinez Tarradell, Hillsboro, OR (US); Debdeep Chatterjee, San Jose, CA (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 16/316,842

(22) PCT Filed: Aug. 1, 2017

(86) PCT No.: PCT/US2017/044946
§ 371 (c)(1),
(2) Date: Jan. 10, 2019

(87) PCT Pub. No.: WO2018/031300
PCT Pub. Date: Feb. 15, 2018

(65) Prior Publication Data
US 2020/0187256 A1 Jun. 11, 2020

Related U.S. Application Data

(60) Provisional application No. 62/373,894, filed on Aug. 11, 2016, provisional application No. 62/401,712, filed on Sep. 29, 2016.

(51) Int. Cl.
*H04W 72/04* (2009.01)
*H04W 74/08* (2009.01)
*H04L 5/00* (2006.01)

(52) U.S. Cl.
CPC ....... *H04W 74/0833* (2013.01); *H04L 5/0048* (2013.01); *H04W 72/042* (2013.01)

(58) Field of Classification Search
CPC . H04W 74/08; H04W 72/04; H04W 74/0833; H04W 72/042; H04L 5/00; H04L 5/0048
See application file for complete search history.

(56) References Cited

U.S. PATENT DOCUMENTS

| 10,251,160 | B2 * | 4/2019 | Jung | ...................... H04W 76/14 |
| 2017/0013598 | A1 * | 1/2017 | Jung | ...................... H04W 72/02 |

(Continued)

OTHER PUBLICATIONS

International Search Report and Written Opinion dated Oct. 20, 2017 for PCT Application PCT/US2017/044946.

(Continued)

*Primary Examiner* — Chi Ho A Lee
(74) *Attorney, Agent, or Firm* — Eschweiler & Potashnik, LLC

(57) ABSTRACT

A Narrowband-Internet-of-Things (NB-IoT) device may select between multiple carrier resources (of an anchor carrier and/or non-anchor carriers) to perform a Narrowband Physical Random Access Channel (NPRACH) procedure. The NB-IoT device may determine, based on a reference signal from an enhanced NodeB (eNB), a coverage level for the NB-IoT device and receive carrier configuration information, from the eNB, that indicates the carriers (e.g., an anchor carrier and one or more non-anchor carriers) that are available for NPRACH procedure. The NB-IoT device may select a carrier resource from among the carriers based on factors, such as the coverage level of the NB-IoT device and the Reference Signals Received Power (RSRP) thresholds and Repetition levels of the carrier resources. The NB-IoT device may use the selected carrier resource to initiate the NPRACH procedure.

25 Claims, 12 Drawing Sheets

(56) References Cited

U.S. PATENT DOCUMENTS

| | | | |
|---|---|---|---|
| 2017/0105127 A1* | 4/2017 | Xiong | H04B 7/0626 |
| 2017/0238292 A1* | 8/2017 | Rico Alvarino | B65D 19/385 |
| | | | 370/329 |
| 2018/0077722 A1* | 3/2018 | Awad | H04W 72/0446 |
| 2018/0145819 A1* | 5/2018 | Axmon | H04L 5/16 |
| 2018/0242179 A1* | 8/2018 | Rathonyi | H04W 72/048 |
| 2018/0352590 A1* | 12/2018 | Sha | H04W 72/0453 |
| 2019/0174434 A1* | 6/2019 | Koskinen | H04W 52/242 |
| 2019/0357200 A1* | 11/2019 | Futaki | H04W 48/16 |
| 2020/0305187 A1* | 9/2020 | Takeda | H04W 28/18 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)." 3GPP TS 36.331 V13.2.0 (Jun. 2016). Lte Advanced Pro. 623 pages.

"3rd Generation Partnership Project; Technical Specification Group Radio Access Network; Evolved Universal Terrestrial Radio Access (E-UTRA); Medium Access Control (MAC) protocol specification (Release 13)." 3GPP TS 36.321 V.13.2.0 (Jun. 2016). Lte Advanced Pro. 91 pages.

* cited by examiner

| NPRACH resource configuration | | | | | |
|---|---|---|---|---|---|
| NPRACH Resource | NPRACH Carrier | RSRP Threashold | Maximum Coverage Level | Repetition Level (RL) | ... |
| 1 | Anchor carrier | K1 | CL1 | RL1 | ... |
| 2 | Anchor carrier | K1 | CL2 | RL2 | ... |
| 3 | Non-anchor carrier 1 | K1 | CL1 | RL1 | ... |
| 4 | Non-anchor carrier 1 | K1 | CL2 | RL2 | ... |
| 6 | Non-anchor carrier 2 | K1 | CL1 | RL1 | ... |
| 7 | Non-anchor carrier 2 | K1 | CL2 | RL2 | ... |
| ... | ... | ... | ... | ... | ... |

Fig. 3

| NPRACH resource configuration |||||  |
|---|---|---|---|---|---|
| NPRACH Resource | NPRACH Carrier | RSRP Threashold | Maximum Coverage Level | Repetition Level (RL) | ... |
| 1 | Anchor carrier | K1 | CL1 | RL1 | ... |
| 2 | Anchor carrier | K2 | CL2 | RL2 | ... |
| 3 | Non-anchor carrier 1 | K1 | CL1 | RL1 | ... |
| 4 | Non-anchor carrier 2 | K2 | CL2 | RL2 | ... |

Fig. 4

| NPRACH resource configuration | | | | | |
|---|---|---|---|---|---|
| NPRACH Resource | NPRACH Carrier | RSRP Threashold | Maximum Coverage Level | Repetition Level (RL) | ... |
| 1 | Anchor carrier | K1 | RL1 | RL1 | ... |
| 2 | Anchor carrier | K2 | RL2 | RL2 | ... |
| 3 | Anchor carrier | K3 | RL3 | RL3 | ... |
| 4 | Non-anchor carrier 1 | K1 | RL1 | RL1 | ... |
| 5 | Non-anchor carrier 1 | K2 | RL2 | RL2 | ... |
| 6 | Non-anchor carrier 2 | K1 | RL1 | RL1 | ... |
| 7 | Non-anchor carrier 2 | K3 | RL3 | RL3 | ... |
| ... | ... | ... | ... | ... | ... |

Fig. 5

| NPRACH resource configuration ||||||
| --- | --- | --- | --- | --- | --- |
| NPRACH Resource | NPRACH Carrier | Repetition Level (RL) | Maximum Coverage Level | RSRP Threashold | ... |
| 1 | Anchor carrier | RL1 | RL1 | K1 | ... |
| 2 | Anchor carrier | RL2 | RL2 | K2 | ... |
| 3 | Anchor carrier | RL3 | RL3 | K3 | ... |
| 4 | Non-anchor carrier 1 | RL1 | *Characteristics inferred from anchor carrier based on repetition level* |||
| 5 | Non-anchor carrier 1 | RL2 | :::|||
| 6 | Non-anchor carrier 2 | RL1 | :::|||
| 7 | Non-anchor carrier 2 | RL3 | :::|||
| ... | ... | ... | :::|||

Fig. 6

SYSTEMS AND METHOD FOR SELECTING CARRIER RESOURCES FOR NARROWBAND PHYSICAL RANDOM ACCESS CHANNEL PROCEDURES

RELATED APPLICATIONS

This application is a National Phase entry application of International Patent Application No. PCT/US2017/044946 filed Aug. 1, 2017, which claims priority to U.S. Provisional Patent Application No. 62/373,894, which was filed on Aug. 11, 2016, and U.S. Provisional Patent Application No. 62/401,712, which was filed on Sep. 29, 2016, and is hereby incorporated by reference in its entirety.

BACKGROUND

Narrowband Internet of Things (NB-IoT) is a Low Power Wide Area (LPWA) technology directed to enabling certain wireless devices (referred to herein as NB-IoT devices) to communicate with wireless telecommunication networks. In contrast to broadband User Equipment (UE) (e.g., smartphones, tablet computers, etc.), NB-IoT devices are often characterized as wireless devices with low throughput, low delay sensitivity, low device complexity, and/or low power consumption. As such, broadband UE and NB-IoT devices may use different wireless resources (e.g., carriers, subcarriers, etc.) and procedures to communicate with a wireless telecommunication network.

According to the 3rd Generation Partnership Project (3GPP) Communication Standards, an NB-IoT device may connect to a wireless telecommunication network using a 180 Kilohertz (kHz) radio frequency (RF) bandwidth. For example, when the NB-IoT is powered on, the NB-IoT may synchronize itself to different carrier radio frequencies and determine whether any of the radio frequencies correspond to a wireless network to which the NB-IoT is configured to connect. Upon discovering such a radio frequency, the NB-IoT may perform a Narrowband Physical Random Access Channel (NPRACH) procedure, in which the NB-IoT device may (in effect) notify the wireless telecommunication network that the NB-IoT device is attempting to connect to the network and, in response, receive temporary resources for performing subsequent procedures, such as a Radio Resource Control (RRC) Connection Establishment procedure, an Authentication procedure, etc.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIGS. 3-6 are diagrams representing different examples of NPRACH resource configurations;

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The techniques described herein may be used to enable Narrowband-Internet-of-Things (NB-IoT) devices to select between multiple carrier resources to initiate and/or perform Narrowband Physical Random Access Channel (NPRACH) procedures. For example, an NB-IoT device may determine, based on a reference signal from an enhanced NodeB (eNB), a coverage level for the NB-IoT device. The NB-IoT device may receive carrier configuration information, via System Information from the eNB, that indicates the carriers (e.g., an anchor carrier and one or more non-anchor carriers) that are available for an NPRACH procedure.

Each carrier may include one or more carrier resources, which may include a portion of the carrier that is designated and/or available to communicate with the eNB for NPRACH procedures. Additionally, the carrier configuration information may include attributes or characteristics of the carrier resources, such as Reference Signals Received Power (RSRP) thresholds, Repetition levels, etc. The NB-IoT device may select a carrier resource based on certain factors, such as the coverage level of the NB-IoT device and the RSRP thresholds and Repetition levels of the carrier resources. The NB-IoT device may use the selected carrier resource to initiate the NPRACH procedure.

In some embodiments, prior to selecting a carrier resource, the NB-IoT device may determine whether the NB-IoT device is capable and/or permitted to selected between carrier resources of the anchor carrier and/or non-anchor carriers. Additionally, the NB-IoT device may use one or more techniques to select between the available carrier resources, such as randomly selecting (which may involve one or more probability values from the eNB) between carrier resources from the anchor carrier and/or carrier resources of the non-anchor carriers. In some embodiments, when an attempt to communicate with the eNB fails, the NB-IoT device may select a different carrier resource (e.g., a different carrier resource with the same characteristics (e.g., the same Repetition level) or a carrier resource with distinct characteristics (e.g., a higher Repetition level)). As such, the techniques described herein may enable an NB-IoT device to select a carrier resource (from an anchor carrier and/or non-anchor carriers) for performing an NPRACH procedure.

Figure 1:
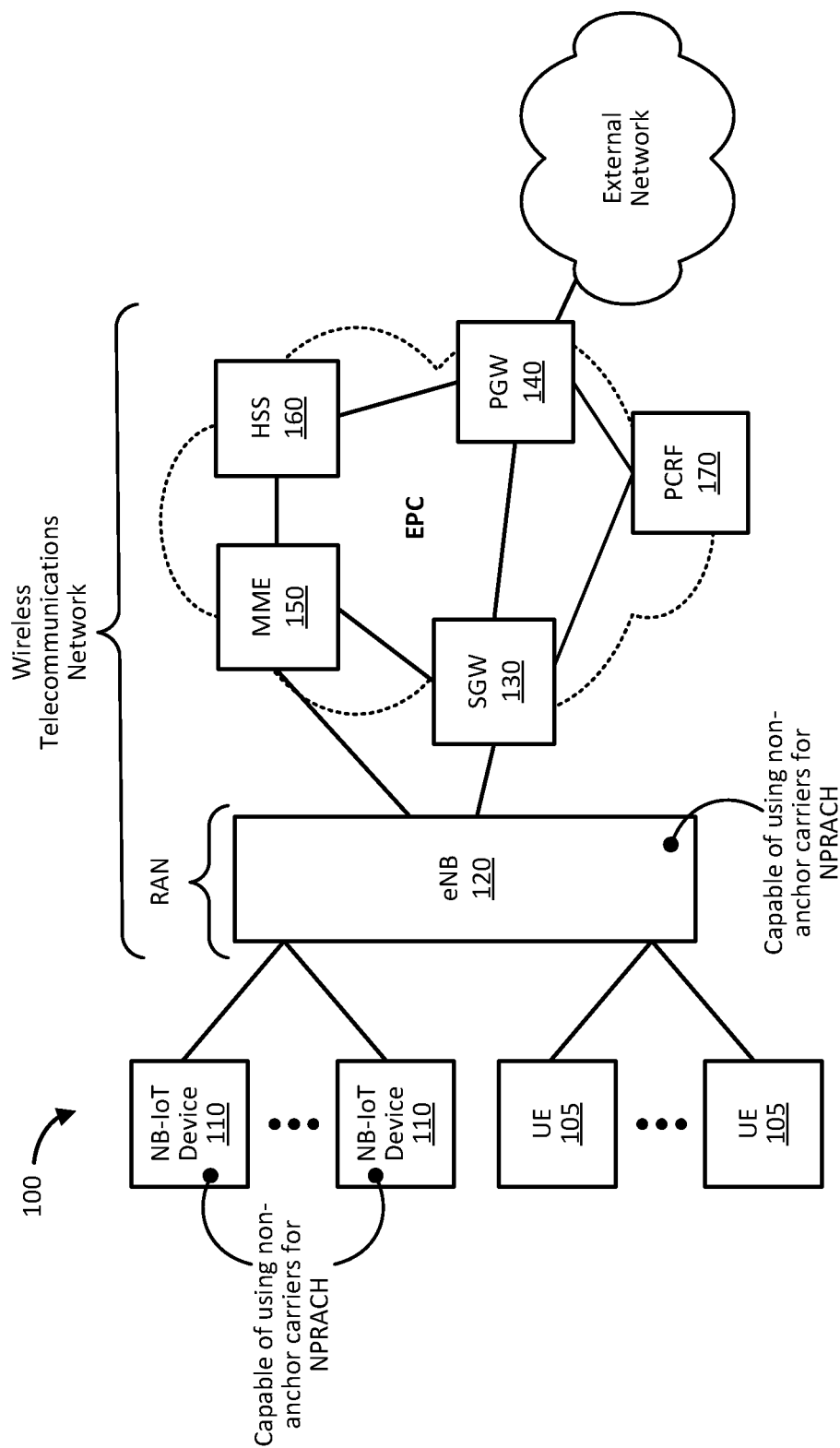
FIG. 1 is a diagram of an example system in which systems and/or methods described herein may be implemented.

FIG. 1 illustrates an example environment 100 in which systems and/or methods described herein may be implemented. Environment 100 may include UEs 105, NB-IoT devices 110, a wireless telecommunications network, and an external network. The network may be, or may include, radio access networks (RANs) that include one or more base stations, some or all of which may take the form of enhanced NodeBs (eNBs) 120, via which UEs 105 and NB-IoT devices 110 may communicate with the EPC network.

The EPC network may include Serving Gateway (SGW) 130, PDN Gateway (PGW) 140, Mobility Management Entity (MME) 150, Home Subscriber Server (HSS) 160, Policy and Charging Rules Function (PCRF) 170. As shown, the EPC network may enable UEs 105 and NB-IoT devices 110 to communicate with an external network, such as a Public Land Mobile Networks (PLMN), a Public Switched Telephone Network (PSTN), and/or an Internet Protocol (IP) network (e.g., the Internet).

UE 105 may include a portable computing and communication device, such as a personal digital assistant (PDA), a smart phone, a cellular phone, a laptop computer with connectivity to the wireless telecommunications network, a tablet computer, etc. UE 105 may also include a non-portable computing device, such as a desktop computer, a consumer or business appliance, or another device that may connect to a RAN of the wireless telecommunications network. UE 105 may also include a computing and communication device that may be worn by a user (also referred to as a wearable device) such as a watch, a fitness band, a necklace, glasses, an eyeglass, a ring, a belt, a headset, or another type of wearable device.

NB-IoT device 110 may include a wireless computing and communication device capable of communicating with the wireless telecommunication network via eNB 120. Examples of NB-IoT device 110 may include a device within a tracking device (e.g., pet tracking devices), vehicle communication devices, environmental (e.g., precipitation, seismic, temperature, etc.) monitoring devices, medical implant devices (e.g., heart monitors, blood pressure monitors, etc.), home automation devices (e.g., to home lighting, heating, and security systems), vending machines, utility meters, parking meters, and more. NB-IoT device 110 may include a machine-to-machine (M2M) services, a machine-type-communication (MTC) device, or another type of device that communicates with a wireless telecommunication network in a similar manner. In some embodiments, while UE 105 is described above as more of a broadband type wireless device, it is possible that in some embodiments, NB-IoT device 110 may be a type of UE 105.

NB-IoT device 110 may be capable of determining a coverage level for the NB-IoT device with respect to eNB 120 and receiving carrier configuration information, from eNB 120, which may include the carrier resources (e.g., the carrier resources of the anchor carrier and/or the carrier resources of the non-anchor carriers) available for NPRACH procedure. The carrier configuration information may also include characteristics of the carrier resources, such as RSRP thresholds, Repetition levels, etc. The NB-IoT device may select a carrier resource from among the carriers based on factors, such as the coverage level of the NB-IoT device and the Reference Signals Received Power (RSRP) thresholds and Repetition levels of the carrier resources. The NB-IoT device may use the selected carrier resource to initiate the NPRACH procedure.

eNB 120 may include one or more network devices that receives, processes, and/or transmits traffic destined for and/or received from NB-IoT device 110 (e.g., via an air interface). eNB 120 may be connected to a network device, such as a site router, that functions as an intermediary for information communicated between eNB 120 and the EPC.

SGW 130 may aggregate traffic received from one or more eNBs 120 and may send the aggregated traffic to an external network or device via PGW 140. Additionally, SGW 130 may aggregate traffic received from one or more PGWs 140 and may send the aggregated traffic to one or more eNBs 120. SGW 130 may operate as an anchor for the user plane during inter-eNB handovers and as an anchor for mobility between different telecommunication networks. PGW 140 may include one or more network devices that may aggregate traffic received from one or more SGWs 130, and may send the aggregated traffic to an external network. PGW 140 may also, or alternatively, receive traffic from the external network and may send the traffic toward NB-IoT device 110 (via SGW 130 and/or eNB 120).

MME 150 may include one or more computation and communication devices that act as a control node for eNB 120 and/or other devices that provide the air interface for the wireless telecommunications network. For example, MME 150 may perform operations to register NB-IoT device 110 with the wireless telecommunications network, to establish bearer channels (e.g., traffic flows) associated with a session with NB-IoT device 110, to hand off NB-IoT device 110 to a different eNB, MME, or another network, and/or to perform other operations. MME 150 may perform policing operations on traffic destined for and/or received from NB-IoT device 110.

HSS 160 may include one or more devices that may manage, update, and/or store, in a memory associated with HSS 160, profile information associated with a subscriber (e.g., a subscriber associated with NB-IoT device 110). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with NB-IoT device 110. Additionally, or alternatively, HSS 160 may perform authentication, authorization, and/or accounting operations associated with the subscriber and/or a communication session with NB-IoT device 110.

PCRF 170 may receive information regarding policies and/or subscriptions from one or more sources, such as subscriber databases and/or from one or more users. PCRF 170 may provide these policies to PGW 140 or another device so that the policies can be enforced. As depicted, in some embodiments, PCRF 170 may communicate with PGW 140 to ensure that charging policies are properly applied to locally routed sessions within the telecommunications network.

The quantity of devices and/or networks, illustrated in FIG. 1, is provided for explanatory purposes only. In practice, environment 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc.

Alternatively, or additionally, one or more of the devices of environment 100 may perform one or more functions described as being performed by another one or more of the devices of environment 100. Additionally, the devices of environment 100 may interconnect with each other and/or other devices via wired connections, wireless connections, or a combination of wired and wireless connections. In some embodiments, one or more devices of environment 100 may be physically integrated in, and/or may be physically attached to, one or more other devices of environment 100. Also, while "direct" connections may be shown between certain devices in FIG. 1, some of said devices may, in practice, communicate with each other via one or more additional devices and/or networks.

Figure 2:
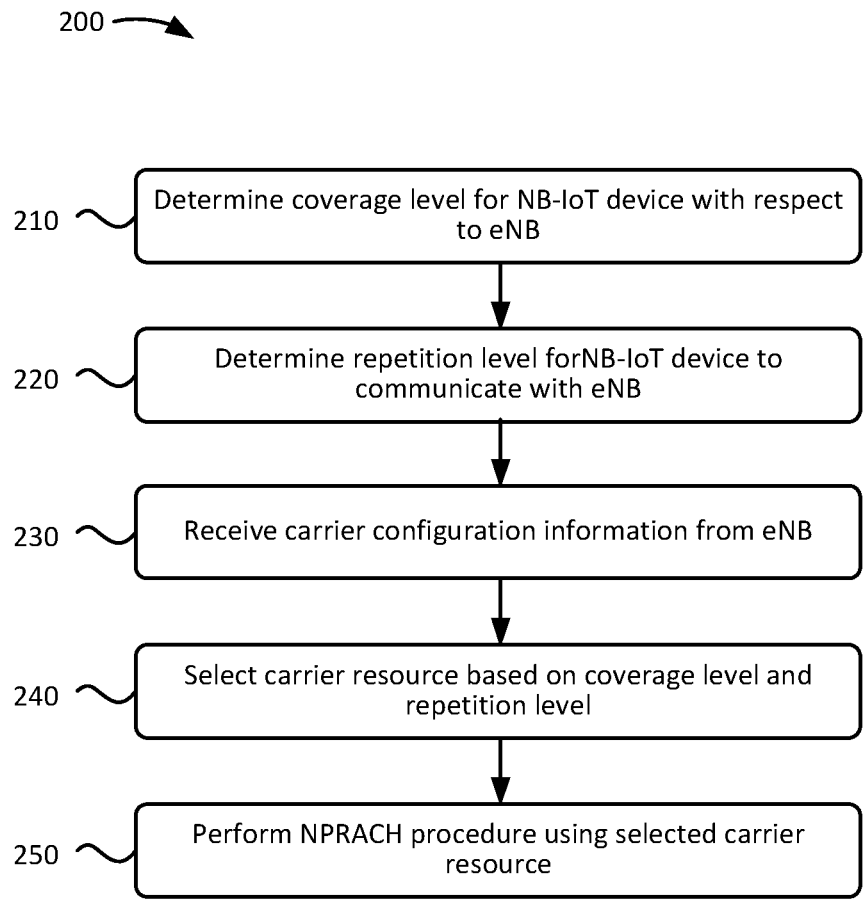
FIG. 2 is a flowchart of an example process for selecting between an anchor carrier and one or more non-anchor carriers to perform a Narrowband Physical Random Access Channel (NPRACH) procedure.

FIG. 2 is a flowchart of an example process 200 for selecting between an anchor carrier and one or more non-anchor carriers to perform a NPRACH procedure. Process 200 may be implemented by NB-IoT device 110. FIG. 2 is described below with reference to FIGS. 3-6.

Process 200 may include determining a coverage level for NB-IoT device 110 with respect to eNB 120 (block 210). For example, NB-IoT device 110 may detect a Narrowband Reference Signal (NRS) from eNB 130. NB-IoT device 110 may measure a power level (e.g., a Reference Signals Received Power (RSRP) level) of the NRS. NB-IoT device 110 may determine the coverage level for NB-IoT device 110 based on the power level of the NRS. For example, NB-IoT device 110 may receive one or more RSRP thresholds and determine the coverage level for the NB-IoT device 110 based on a comparison of the RSRP measured by NB-IoT device 110 to the RSRP thresholds from eNB 120. A relatively high RSRP measurement may correspond to a UE well within the coverage of the cell; whereas a relatively low RSRP may correspond to a UE either at the cell edge of the cell or in poor coverage (e.g. a smart meter in a cell). In some embodiments, NB-IoT device 110 may receive, from eNB 120, a function and/or data structure (e.g., an index, table, array, algorithm, etc.) that enables NB-IoT device 110 determine the coverage level for NB-IoT device 110 based on the NRS (e.g., an RSRP of the NRS) from eNB 120.

In some embodiments, all carriers available for NPRACH transmissions support the same maximum coverage level and the same number of coverage levels. In some embodiments, each carrier available for NPRACH transmission may support a different minimum starting repetition level but the same maximum repetition/coverage level as the anchor carrier or support the same minimum starting repetition level but a different maximum repetition/coverage level as the anchor carrier. In some embodiments, some non-anchor carriers may include the same maximum coverage level and the same number of coverage level of the anchor carrier, and other carriers anchor carriers may include a different minimum starting repetition level but the same maximum repetition/coverage level as the anchor carrier or support the same minimum starting repetition level but a different maximum repetition/coverage level as the anchor carrier. In some embodiment, each carrier available for NPRACH transmission may support different number of coverage levels to the anchor carrier.

Process 200 may include determining a repetition level for NB-IoT device 110 to communicate with eNB 120 (block 220). For instance, NB-IoT device 110 may determine a number (or quantity) of repetitions that NB-IoT device 110 may be configured to prefer for transmitting a random access preamble to reach eNB 110. The number of repetitions may be based, or otherwise related to, the determined coverage level for NB-IoT device 110. When NB-IoT device 110 has a relatively low coverage level, the chances of transmission failure (e.g., that eNB 120 may not receive a transmission from NB-IoT device 110) may be relatively high; whereas when NB-IoT device 110 has a relatively high coverage level, the chances of a transmission failure may be relatively low. As such, a UE with a lower coverage level (and therefore a greater chance of transmission failure) may benefit from a carrier resource configured for a greater number of repetition, while a UE with a higher coverage level (and therefore a reduced chance of transmission failure) may not benefit as much from a carrier resource configured for as many repetitions. In some embodiments, NB-IoT device 110 may receive, from eNB 120, a function and/or data structure (e.g., an index, table, array, algorithm, etc.) that enables NB-IoT device 110 determine the number of repetitions for NB-IoT device 110 based on the coverage level of NB-IoT device 110.

Process 200 may include receiving carrier configuration information for performing an NPRACH procedure with respect to eNB 120 (block 230). For instance, NB-IoT device 110 may synchronize to a broadcast channel used by eNB 120 to transmit a Master Information Block (MIB) to NB-IoT devices 110. NB-IoT device 110 may obtain and decode the MIB, and use the MIB to read System Information Blocks (SIBs (e.g., SIB1, SIB2, etc.)) transmitted by eNB 120 to NB-IoT devices 110. One or more of the SIBs (e.g., SIB2) may include information about multiple carriers (e.g., an anchor carrier and one or more non-anchor carriers) that NB-IoT device 110 may use to perform an NPRACH procedure with respect to eNB 120. Carrier configuration information for the anchor carrier and/or the non-anchor carriers may be sent, from eNB 120 to NB-IoT devices 110, using one or more Information Elements (IEs) of the System Information of the 3GPP Communication Standard, which may include the NPRACH-ConfigSIP-NB, RSRP-ThresholdsPrachInfoList-r13, radioResourceConfigCommon-r13, NPRACH-ConfigSIB-NB, NPRACH-ParametersList-r13, numRepetitionsPerPreambleAttempt, maxNumPreambleAttemptCE, prachrepetitionlevel, etc. In some embodiments, the carrier configuration information may include an Uplink (UL) carrier index for the carrier resources of the anchor and/or non-anchor carriers. The UL carrier index may describe the carrier resources (from the anchor carrier and/or the non-anchor carrier) for UL communications to eNB 120, such as Msg1 and/or Msg3 of the NPRACH procedure. The UL carrier index may be included in an IE from eNB 120, such as the UL-ConfigList-r14 of the 3GPP Communication Standards.

Carrier configuration information may be sent from eNB 120 to NB-IoT device 110 via a common signal/channel, regardless of whether NB-IoT device 110 is in RRC_IDLE mode. In some embodiments, a common signal and a dedicated signal may be used. The carrier configuration information may include a number of carriers available for NPRACH (e.g., an anchor carrier and one or more non-anchor carriers), a number of carrier (random access) resources within each carrier, an associated coverage level for each carrier (random access) resources, and a number of repetitions for each carrier (random access) resource. Carrier configuration information may also contain the number of repetitions required for a Msg2 Narrowband Physical Downlink Control Channel (NPDCCH) for the associated coverage level.

In some embodiments, a dedicated signal/channel (that is sent specifically to NB-IoT device 110) for conveying carrier configuration information may be used. In such embodiments, NB-IoT device 110 may receive carrier configuration information before entering RRC_IDLE mode (e.g., while still in RRC_CONNECTED mode). In some embodiments, NB-IoT device 110 may receive carrier configuration information via common signaling while NB-IoT device 110 is in RRC_CONNECTED mode, via RRC Connection Reconfiguration, during RRC Connection Release, etc. In some implementations, when receiving carrier configuration information while in RRC_CONNECTED mode, NB-IoT device 110 may be restricted to later using the anchor carrier resources or non-anchor carrier resources. For example, some NB-IoT devices 110 may be configured to only use anchor carriers, whereas other NB-IoT devices 110 may be configured to use anchor carriers and non-anchor carriers.

In some implementations, NB-IoT device 110 may use a different carrier resources for different NPRACH procedures. For example, NB-IoT device 110 may use one carrier resource for an initial NPRACH procedure and then subsequently alter (e.g., after entering RRC_IDLE mode) use a different carrier resource for another NPRACH procedure. In some implementations, this frequency hopping (FH) may be the result of instructions received from eNB 120 (e.g., via RRC configuration) or the result of NB-IoT device 110 monitoring carrier resource usage and availability information.

Additionally, or alternatively, the carrier configuration information may include, for each carrier resource, timing information (e.g., a starting time, a periodicity, and/or an NPRACH period) for using the carrier resource to perform an NPRACH procedure. In some embodiments, each NPRACH resource configuration, for each non-anchor carrier, may be provided independently, which may enable there to be a common or different number of NPRACH resources for each repetition level (e.g., number of repetitions) supported by eNB 120. In some embodiments, this may provide increased flexibility and diversification (in terms of providing carrier resources with diverse coverage levels and number of repetitions), which may be at a cost of signaling overhead.

In some embodiments, one or more carrier resource configuration techniques may be implemented to reduce signaling overhead while maintaining increased carrier resource flexibility and diversification. For example, for a particular repetition level, the NPRACH resource configuration on a non-anchor carrier is same as the configuration in the anchor carrier except the NPRACH starting time of the NPRACH period and possibly also the periodicity. As such, carrier configuration information for non-anchor carriers may be reduced to a repetition level and timing information (e.g., a starting time, a periodicity, and/or an NPRACH period) for each subcarrier, while other configuration information for the subcarriers (e.g., the power level, etc.) may be inferred from the configuration information for the anchor carrier, via common repetition levels between anchor and non-anchor subcarriers.

FIGS. 3-6 are diagrams representing different examples of NPRACH resource configurations.

In some embodiments, one or more of the characteristics of a carrier resource may be inferred from a characteristic of another carrier resource of an anchor carrier and a characteristic of a non-anchor carrier. For example, FIG. 6 includes a NPRACH resource configuration that is similar to the NPRACH resource configuration of FIG. 5, in that the anchor carrier includes 3 carrier resources and each non-anchor carrier includes two carrier resources. The characteristics for the carrier resources of the anchor carriers are provided in their entirety; however, some of the characteristics (i.e., maximum coverage level and RSRP threshold) for the carrier resources are not provided. In such a scenario, the unprovided characteristics for the non-anchor carrier resources may be inferred by matching the repetition level of the non-anchor carrier resource to the corresponding carrier resource of the anchor carrier. For example, since the repetition level attribute (RL1) for NPRACH resource 4 matches the repetition level attribute for NPRACH resource 1, it may be inferred that the maximum coverage level and the RSRP threshold for NPRACH resource 4 also match the maximum coverage level and the RSRP threshold for NPRACH resource 1. The characteristics for NPRACH resources 5-7 may be inferred in a similar way. As such, the carrier configuration information provided to NB-IoT device 110, from eNB 120, may be incomplete (e.g., may not explicitly include every characteristic of each carrier resource), in which case NB-IoT device 110 may infer the incomplete information based on the characteristics of other carrier resources. Additionally, the carrier resources of each of the non-anchor carrier include characteristics that are similar to different carrier resources of the anchor carrier. For instance, the characteristics of NPRACH resource 1 of the anchor carrier are similar to the characteristics of NPRACH resource 3 of non-anchor carrier 1, whereas the characteristics of NPRACH resource 2 of the anchor carrier are similar to the characteristics of NPRACH resource 4 of non-anchor carrier 2.

The NPRACH resource configuration of FIG. 5 includes an anchor carrier with three carrier resources (NPRACH resources 1, 2, and 3), while each non-anchor carrier includes two carrier resources (NPRACH resources 3 and 4 for non-anchor carrier 1; and NPRACH resource 5 and 6 for non-anchor carrier 2). Additionally, each carrier resource of the non-anchor carriers includes characteristics that are similar to one of the carrier resources of the anchor carrier; however, the non-anchor carriers do not include the same two anchor carriers. For example, non-anchor carrier 1 includes carrier resources 4 and 5, which are similar to carrier resources 1 and 2 of the anchor carrier. By contrast, non-anchor carrier 2 includes carrier resources 6 and 7, which are similar to carrier resources 1 and 3 of the anchor carrier.

In some embodiments, one or more of the characteristics of a carrier resource may be inferred from a characteristic of another carrier resource of an anchor carrier and a characteristic of a non-anchor carrier. For example, FIG. 6 includes a NPRACH resource configuration that is similar to the NPRACH resource configuration of FIG. 6, in that the anchor carrier includes 3 carrier resources and each non-anchor carrier includes two carrier resources. The characteristics for the carrier resources of the anchor carriers are provided in their entirety; however, some of the characteristics (i.e., maximum coverage level and RSRP threshold) for the carrier resources are not provided. In such a scenario, the unprovided characteristics for the non-anchor carrier resources may be inferred by matching the repetition level of the non-anchor carrier resource to the corresponding carrier resource of the anchor carrier. For example, since the repetition level attribute (RL1) for NPRACH resource 4 matches the repetition level attribute for NPRACH resource 1, it may be inferred that the maximum coverage level and the RSRP threshold for NPRACH resource 4 also match the maximum coverage level and the RSRP threshold for NPRACH resource 1. The characteristics for NPRACH resources 5-7 may be inferred in a similar way. As such, the carrier configuration information provided to NB-IoT device 110, from eNB 120, may be incomplete (e.g., may not explicitly include every characteristic of each carrier resource), in which case NB-IoT device 110 may infer the incomplete information based on the characteristics of other carrier resources.

Returning to FIG. 2, process 200 may include selecting a carrier resource based on the coverage level and repetition level determined by NB-IoT device 110 (block 240). For example, NB-IoT device 110 may determine, based on the carrier configuration information from eNB 120, which carrier resource corresponds to the coverage level and repetition level determined by NB-IoT device 110. In some embodiments, NB-IoT device 110 may implement one or more techniques for selecting a carrier resource. This may include comparing, mapping, matching, etc., the coverage level of NB-IoT device 110 to the PRACH resources (e.g., the carrier resources of the anchor carrier and one or more non-anchor carriers). Examples of such techniques are described below with reference to FIGS. 7-8.

Figure 7:
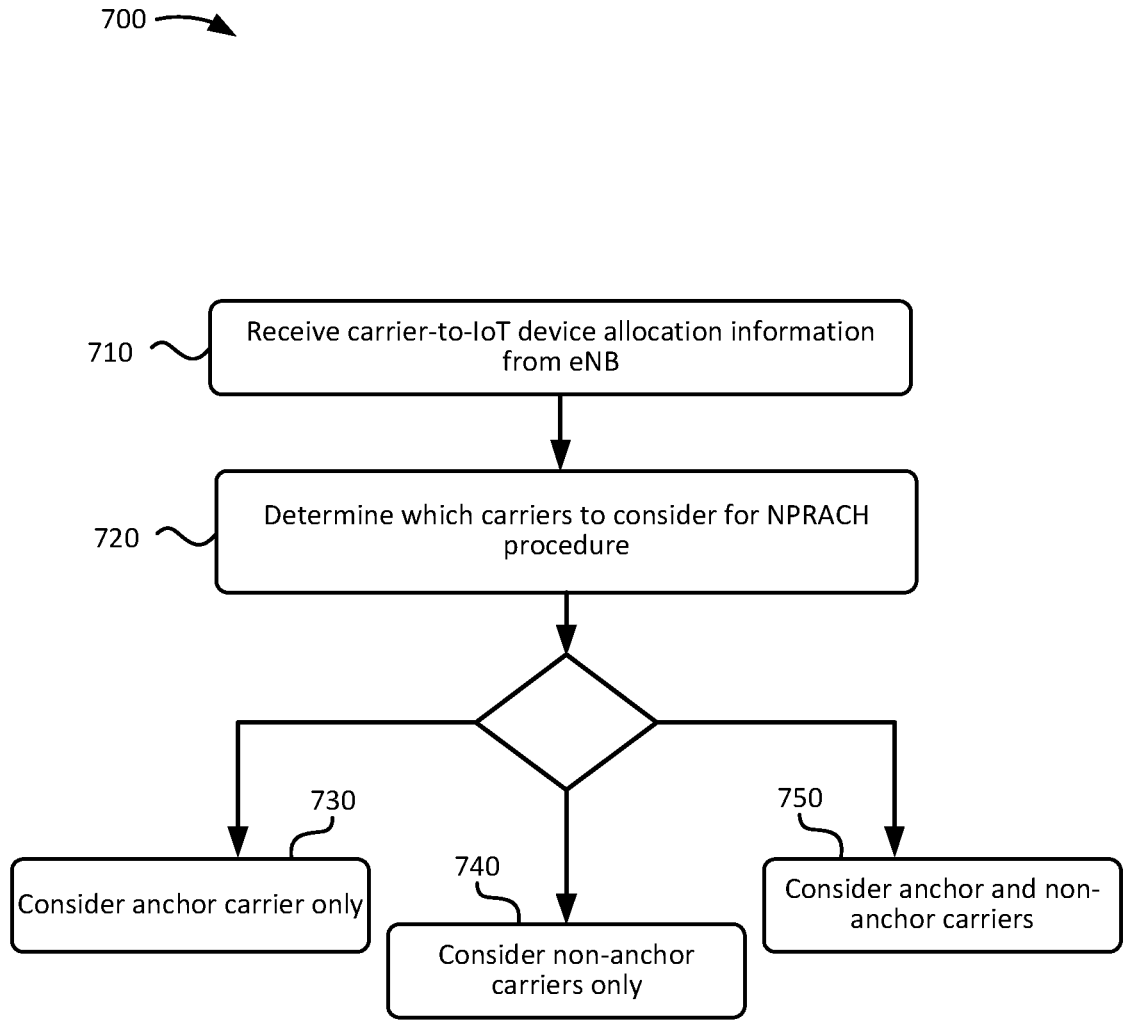
FIG. 7 is a flowchart of an example process for determining which carriers to consider for performing an NPRACH procedure.

FIG. 7 is a flowchart of an example process 700 for determining which carriers to consider for performing an NPRACH procedure. Process 700 may be implemented by NB-IoT device 110 or a combination of NB-IoT device 110 and eNB 120.

As shown, process 700 may include receiving carrier-to-IoT device allocation information from eNB 120 (block 710). Carrier-to-IoT device allocation information may indicate the types of carrier resources that NB-IoT device 110 may consider while selecting a carrier resource for an NPRACH procedure. The carrier-to-IoT device allocation information may indicate whether, for example, a particular UE may consider carrier resources of only anchor carriers, carrier resources of only non-anchor carriers, and/or carrier resources of anchor carriers and non-anchor carriers.

Process 700 may include determining which carriers to consider for the NPRACH procedure (block 720). For example, NB-IoT device 110 may use the carrier-to-IoT device allocation information to determine whether NB-IoT device 110 should consider only anchor carriers, non-anchor carriers, or both anchor carriers and non-anchor carriers for the NPRACH procedure. For instance, certain types of NB-IoT devices 110 may not be configured to use non-anchor carriers for NPRACH procedures, and NB-IoT device 110 may use the carrier-to-IoT device allocation information to determine whether the UE is that type of UE. In some embodiments, eNB 120 may have determined that there is a disproportionate quantity of NB-IoT devices 110 using anchor carriers (instead of non-anchor carriers), and therefore, the carrier-to-IoT device allocation information may indicate that NB-IoT devices 110 capable of using non-anchor carriers should only consider non-anchor carriers for NPRACH procedures. In some embodiments, eNB 120 may determine that there are plenty of carrier resources among both anchor carriers and non-anchor carriers, and therefore, the carrier-to-IoT device allocation information may indicate that NB-IoT devices 110 capable of using anchor carriers and non-anchor carriers may consider both anchor carriers and non-anchor carriers for NPRACH procedures. As such, NB-IoT device 110 may consider carriers for the NPRACH procedure based on the carrier-to-IoT device allocation information from eNB 120 (block 730, block 740, or block 750).

Figure 8:
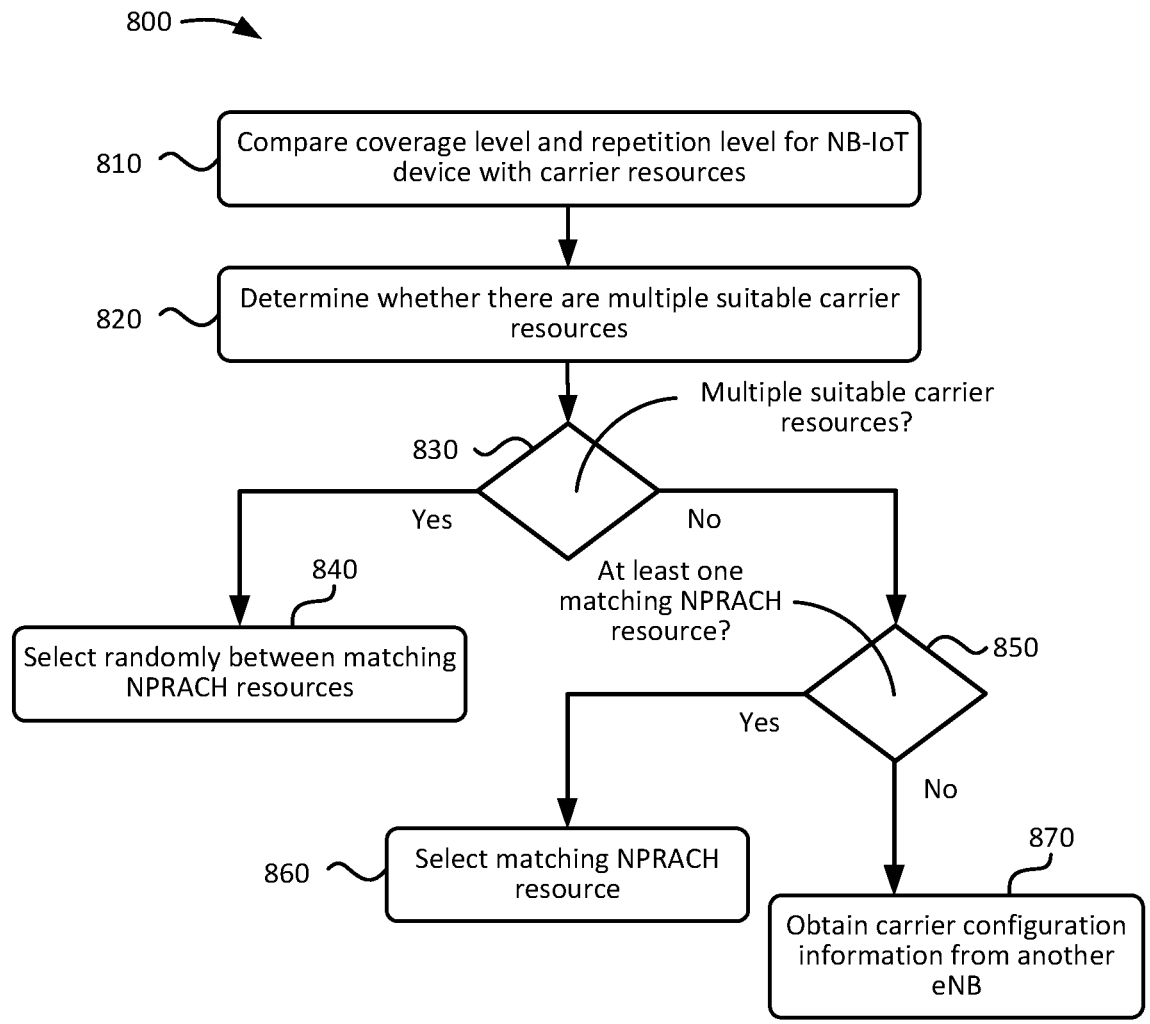
FIG. 8 is a flowchart of an example process for selecting a carrier resource for performing an NPRACH procedure.

FIG. 8 is a flowchart of an example process 800 for selecting a carrier resource for performing an NPRACH procedure. Process 800 may be implemented by NB-IoT device 110 or a combination of NB-IoT device 110 and eNB 120. In some embodiments, process 800 may be performed in combination with one or more of the other processes described herein, such as those described in FIGS. 2 and/or 7.

As shown, process 800 may include comparing a coverage level and repetition level of NB-IoT device 110 with carrier resources (block 810). For example, NB-IoT device 110 may determine which carrier resources of the anchor carrier and/or non-anchor carrier include characteristics that correspond to the coverage level and repetition level of NB-IoT device 110. In some embodiments, this may include determining whether, for example, the coverage level (e.g., the RSRP) measure by NB-IoT device 110 satisfies the RSRP threshold of a particular carrier resource and whether the repetition level of the particular carrier resource satisfies the repetition level determined by NB-IoT device 110.

Process 800 may also include determining whether there are multiple suitable carrier resources (block 820). For instance, comparing the carrier preferences (e.g., coverage level and repetition level of NB-IoT device 110) to the characteristics of the carrier resources, NB-IoT device 110 may determine whether there are multiple carrier resources that satisfy the carrier preferences of NB-IoT device 110 (i.e., whether there are more than one carrier resources that NB-IoT device 110 may use to perform a NPRACH procedure).

When there are multiple suitable carrier resources for an associated coverage level are determined (block 830—Yes), NB-IoT device 110 may randomly select a carrier resource amongst the suitable carrier resources (block 840). A suitable carrier resource may include a carrier resource with an RSRP threshold and/or a Repetition Level that is commensurate with the coverage level determined by NB-IoT device 110. In some embodiments, NB-IoT device 110 may use one or more probability values (also referred to herein as selection probabilities) for selecting between carrier resources. For example, NB-IoT device 110 may receive as part of the carrier configuration information from eNB 120 (or as part of another communication from eNB 120) a probability value (PV) for selecting a carrier resource from the anchor carrier or one of the non-anchor carriers. In some embodiments, the probability value (or selection probability) may be conveyed, from eNB 120 to NB-IoT device 110 for the anchor carrier, via the IE nprach-ProbabiltyAnchor of the 3GPP Communication Standards.

For example, assume that the probability value for selecting an anchor carrier is a value between zero (0) and one (1), such as 0.3, such that there is a 30% chance that NB-IoT device 110 is to select a carrier resource from the anchor carrier and a 70% chance that NB-IoT device 110 is to use a carrier resource from one of the non-anchor carriers. Based on a random draw between 0 and 1, if the number pick is less than 0.3, NB-IoT device 110 may select the random access resources of the anchor carrier. Otherwise, NB-IoT device 110 may randomly select the random access resources from among the non-anchor carrier with equal probability. Additionally, or alternatively, NB-IoT device 110 may also use the probability value (PV) to determine a chance (or assign a percentage value) for randomly selecting any one of the suitable carrier resources of the anchor and non-anchor carriers. This may be achieved by calculating the individual non-anchor carrier resource probability (INACRP), as follows: INACRV=((1−PV)/QNACR), where PV is the probability value and QNACR is the quantity of non-anchor PRACH resource. As such, the probability of NB-IoT device 110 selecting an anchor carrier resource may be determined by the PV, and the probability of NB-IoT device 110 selecting any one of the available (or suitable) non-anchor carriers resource may be an equal portion of the remaining probability of 1-PV. In such a scenario, NB-IoT device 110 may randomly generate a number between 1 and 0, and apply the randomly generated number to the probability value and the INACRP values to randomly select a carrier resource from among the anchor carrier and non-anchor carriers.

When there are not multiple suitable carrier resources (block 830—No), NB-IoT device 110 may determine whether there is at least on suitable carrier resource (block 850). When there is at least one suitable carrier resource (block 850—Yes), NB-IoT device 110 may select the suitable carrier resource for performing the NPRACH procedure (block 860). When there are not any suitable carrier resources (block 850—No), NB-IoT device 110 attempt to obtain carrier configuration information from a different eNB 120 in the area (block 870). Upon obtaining carrier information from another eNB 120, NB-IoT device 110 may perform one or more of the processes and/or operation described herein for selecting an appropriate carrier resource for performing an NPRACH procedure.

Returning now to FIG. 2, process 200 may include performing an NPRACH procedure using the selected carrier resource (block 250). For example, after NB-IoT device 110 determines, based on a reference signal from eNB 120, a coverage level and repetition level, and after selecting a carrier resource that correspond to the coverage level and repetition level, NB-IoT device 110 may use the carrier resource to initiate a NPRACH procedure with eNB 120. The NPRACH procedure may include NB-IoT device 110 sending a Msg1/preamble transmission to eNB 120; eNB 120 responding by sending a Msg2 Random Access Response to NB-IoT device 110; in turn, NB-IoT device 110 may send eNB 110 a Msg3 RRC Connection Request Message; and eNB 120 sending NB-IoT device 110 a Contention Resolution Message to NB-IoT device 110. After performing the NPRACH procedure, NB-IoT device 110 may perform one or more other connection procedures, such as an RRC Connection Establish procedure.

In some embodiments, eNB 120 may allocate one or more (e.g., up to two) carriers, for each NPRACH carrier resource, as a Common Search Space (CSS) for NB-IoT device 110 to monitor for NPDCCH Random Access Response (RAR) information (e.g., Msg2, Msg4, and an RRC connection setup message (if transmitted separately from Msg4)). When only one carrier is allocated for CSS (which may be a Type2-CSS), the carrier (e.g., the anchor carrier or a particular non-anchor carrier) that NB-IoT device 110 uses to initiate the NPRACH procedure (e.g., sending Msg1/preamble transmission to eNB 120) may also be used by NB-IoT device 110 to monitor the NPDCCH for Msg2 scheduling information and/or receiving Msg2.

In some embodiments, the same DL carrier that NB-IoT device 110 may use to monitor the NPDCCH and NPDSCH in order to receive Msg2 may be the same carrier that NB-IoT device 110 may use to receive (via NPDCCH) an Msg3 retransmission message and/or an Msg4 (and/or the RRC connection setup message if transmitted separately) scheduling information. Additionally, or alternatively, the same DL carrier that NB-IoT device 110 may use to monitor the NPDCCH and NPDSCH in order to receive Msg2 may be used to monitor the NPDSCH to receive Msg4 (and/or the RRC connection setup message if transmitted separately). In some embodiments, NB-IoT device 110 may use the same UL carrier to communicate Msg 3 to eNB 120 as NB-IoT device 110 use to communicate Msg1. As such, when NB-IoT device 110 uses a particular carrier (an anchor carrier or non-anchor carrier) to initiate a NPRACH procedure (e.g., send Msg1 to eNB 120), NB-IoT device 110 may use the same carrier for other portions of the NPRACH procedure, such as receiving Msg2, sending Msg3, receiving Msg4, etc.

Figure 9:
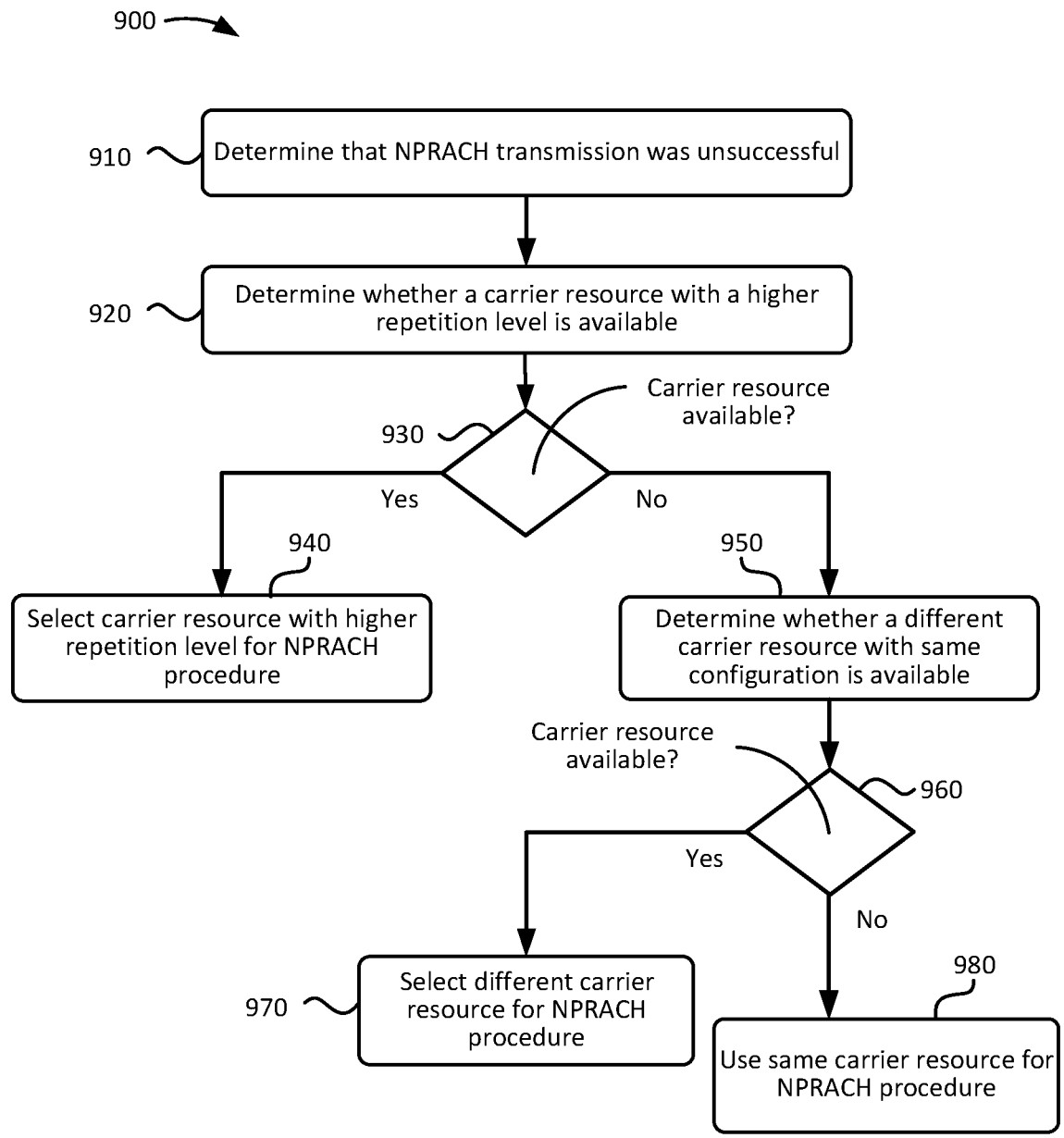
FIG. 9 is a diagram of an example process for responding to a failed attempt to communicate with an enhanced NodeB (eNB)

FIG. 9 is a flowchart of an example process 900 for responding to a failed attempt to communicate with eNB 120. Process 900 may be implemented by NB-IoT device 110 or a combination of NB-IoT device 110 and eNB 120. In some embodiments, process 900 may be performed in combination with one or more of the other processes described herein, such as those described in FIGS. 2, 7, and/or 8.

As shown, process 900 may include determining that an NPRACH transmission was unsuccessful (block 910). For example, NB-IoT device 110 may use a carrier resource to communicate an NPRACH message (e.g., Msg1) to eNB 120 as part of the NPRACH procedure. If eNB 120 does not respond to the message, NB-IoT device 110 may resend the message a number (or quantity) of times, attempts, or iterations, based on the repetition level associated with the carrier resource. If eNB 120 does not respond to any of the retransmitted messages, NB-IoT device 110 may determine that the NPRACH transmission has been unsuccessful.

Process 900 may include determining whether a carrier resource with a higher repetition level is available (block 920). For instance, NB-IoT device 110 may determine, based on carrier configuration information received from eNB 120, whether there are other carrier resources available with a higher repetition level than the carrier resource of the unsuccessful NPRACH transmission. When a carrier resource with a higher repetition level is available (block 930—Yes), NB-IoT device 110 may select the carrier resource with the higher repetition level for another attempt at performing the NPRACH procedure (block 940). In some embodiments, when multiple carrier resources with higher repetition levels are available, NB-IoT device 110 may select between the multiple carrier resources using one or more techniques, such as those described above with reference to FIG. 8.

When a carrier resource with a higher repetition level is not available (block 930—No), process 900 may include determining whether a different carrier resource with the same repetition level is available (block 950). For example, NB-IoT device 110 may determine, based on the carrier information received from eNB 1120, whether there are other carrier resources available with the same repetition level as the carrier resource of the unsuccessful NPRACH transmission. When a different carrier resource with the same repetition level is available (block 960—Yes), NB-IoT device 110 may select the different carrier resource for another attempt at performing the NPRACH procedure (block 970). In some embodiments, when multiple carrier resources with the same repetition level are available, NB-IoT device 110 may select between the multiple carrier resources using one or more techniques, such as those described above with reference to FIG. 8. When a different carrier resource with the same repetition level is not available (block 960—No), NB-IoT device 110 may use the same carrier resource (i.e., the carrier resource of the unsuccessful NPRACH transmission) for another attempt at the NPRACH procedure (block 980).

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
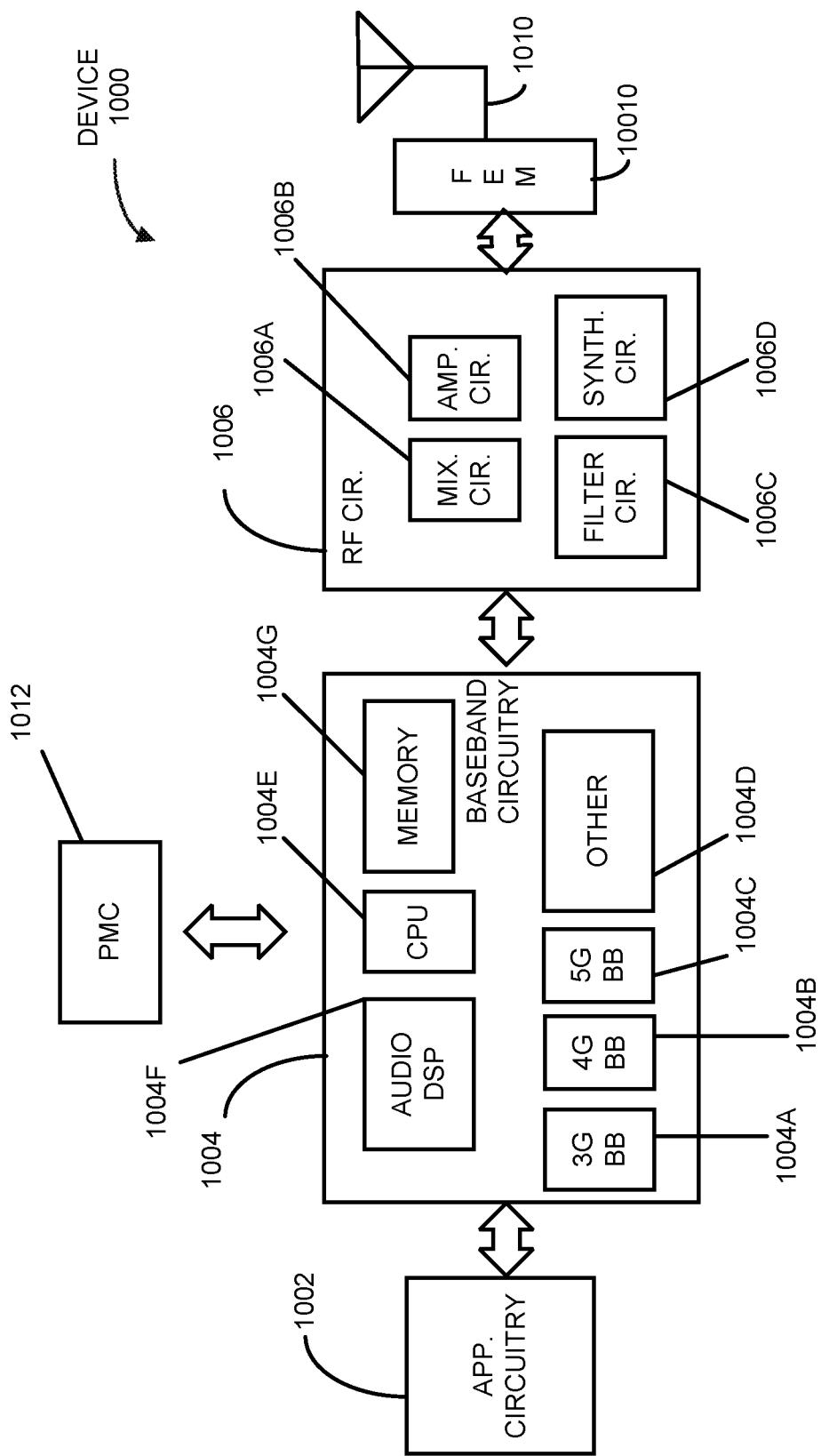
FIG. 10 illustrates example components of a device in accordance with some embodiments.

Embodiments described herein may be implemented into a system using any suitably configured hardware and/or software. FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
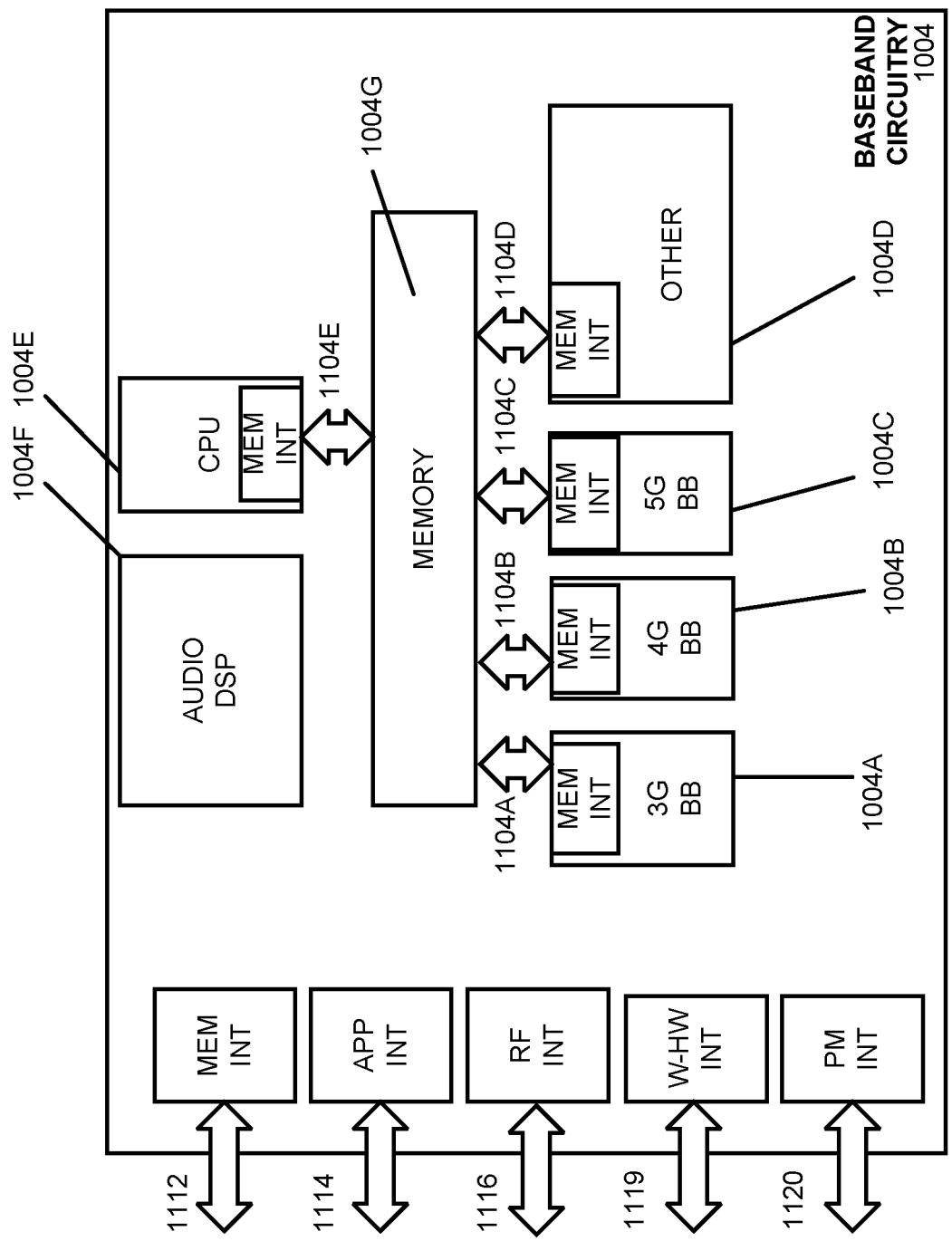
FIG. 11 illustrates example interfaces of baseband circuitry in accordance with some embodiments.

FIG. 11 illustrates example interfaces of baseband circuitry in accordance with some embodiments. As discussed above, the baseband circuitry 1004 of FIG. 10 may comprise processors 1004A-1004E and a memory 1004G utilized by said processors. Each of the processors 1004A-704E may include a memory interface, respectively, to send/receive data to/from the memory 1004G.

The baseband circuitry 1104 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012).

Figure 12:
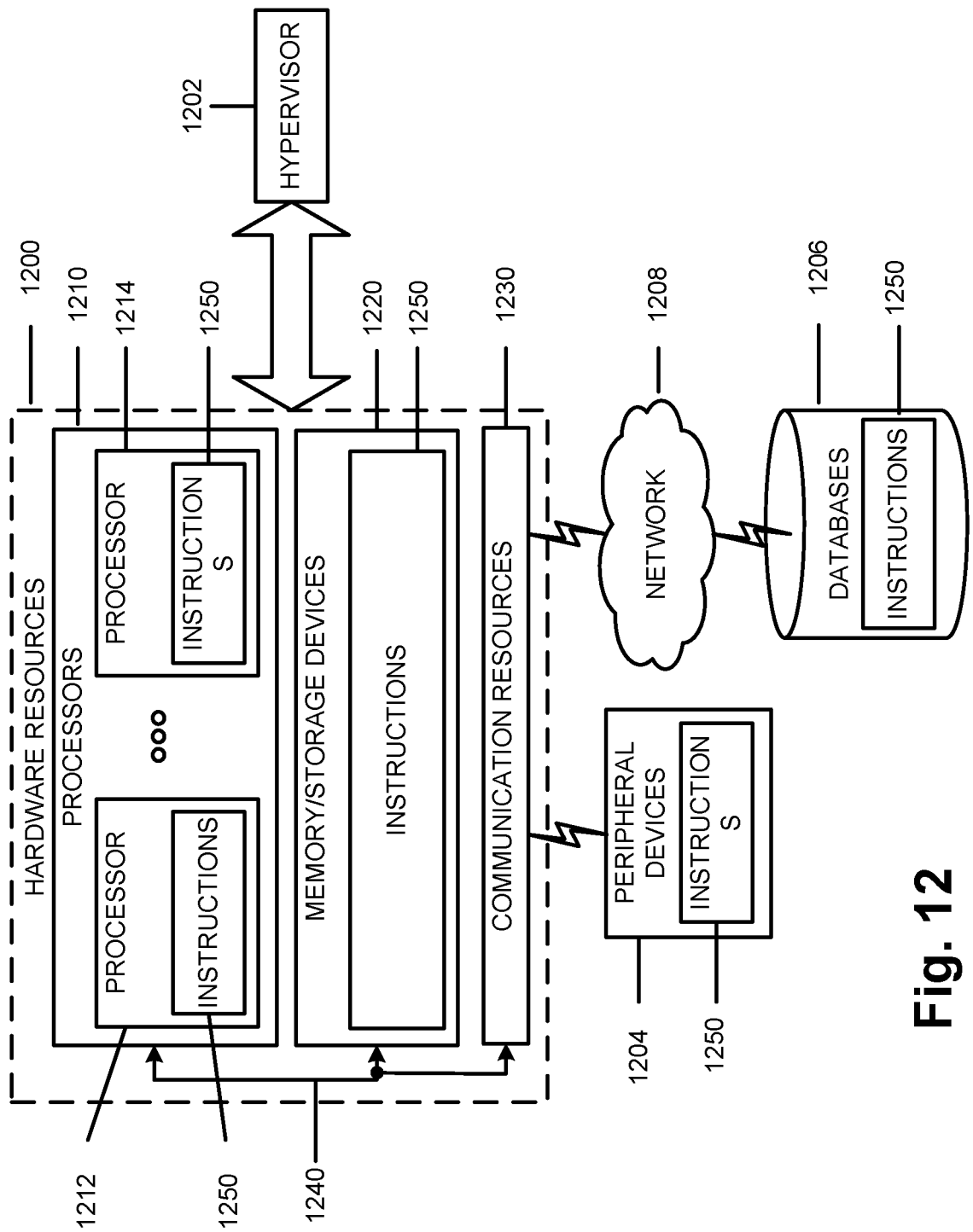
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

A number of examples, relating to embodiments of the techniques described above, will next be given.

In a first example, an apparatus for a baseband processor of Narrowband-Internet-of-Things (NB-IoT) device, may include: a radio frequency (RF) interface to RF circuitry; and one or more processors to: determine, based on a reference signal, received via the RF circuitry, a coverage level of the NB-IoT device; receive, via the RF interface, Reference Signal Received Power (RSRP) thresholds for a plurality of Physical Random Access Channel (PRACH) resources of one or more carriers; map the coverage level of the NB-IoT device to the PRACH resources based on the coverage level of the NB-IoT device and the RSRP thresholds; and when the coverage level of the NB-IoT device maps to multiple PRACH resources, randomly select the PRACH resource, from the multiple PRACH resources, to perform the PRACH procedure.

In example 2, the subject matter of example 1, or any of the examples herein, wherein the one or more processors is to: receive, via the RF interface, selection probabilities for selecting a PRACH resource of the anchor carrier or a PRACH resource of a non-anchor carrier of the one or more non-anchor carriers; and randomly select the PRACH resource based on the selection probabilities.

In example 3, the subject matter of example 2, or any of the examples herein, wherein the selection probabilities include: a first selection probability for selecting a PRACH resource from the anchor carrier or a PRACH resource of a non-anchor carrier of the one or more non-anchor carriers, and a second selection probability for selecting a PRACH resource from the one or more non-anchor carriers.

In example 4, the subject matter of example 3, or any of the examples herein, wherein the second selection probability is equal to: one (1) minus the first selection probability, divided by a quantity of the multiple PRACH resources.

In example 5, the subject matter of example 1, or any of the examples herein, wherein the RSRP thresholds are provided in one or more System Information Blocks.

In example 6, the subject matter of example 1, or any of the examples herein, wherein the RSRP thresholds are received via a Physical Downlink Control Channel (PDCCH).

In a seventh example, an apparatus for a baseband processor of Narrowband-Internet-of-Things (NB-IoT) device may include: a radio frequency (RF) interface to RF circuitry; and one or more processors to: map the NB-IoT device to one or more Physical Random Access Channel (PRACH) carrier resources, of a plurality of carriers, based on a coverage level of the NB-IoT device and Reference Signal Received Power (RSRP) thresholds of the PRACH carrier resources; when the coverage level of the NB-IoT device maps to multiple PRACH carrier resources, randomly select the PRACH carrier resource, from the multiple PRACH carrier resources, to perform the PRACH procedure.

In example 8, the subject matter of example 7, or any of the examples herein, wherein the one or more processors is to: receive, via the RF interface, selection probabilities for selecting between a PRACH carrier resource of the anchor carrier and a PRACH carrier resource of the one or more non-anchor carriers; determine, based on the selection probabilities, a probability for selecting a PRACH carrier resource of the anchor carrier and probabilities for each PRACH carrier resource of the one or more non-anchor carriers; and randomly select the PRACH resource the probabilities.

In example 9, the subject matter of example 8, or any of the examples herein, wherein the probability for selecting the PRACH carrier resource of the anchor carrier is equal to a first selection probability, and the probabilities for selecting each PRACH carrier resource is equal to: one (1) minus the first selection probability, divided by a quantity of the multiple PRACH resources.

In a tenth example, the subject matter of example 1 or 7, or any of the examples herein, wherein the plurality of carriers include an anchor carrier and one or more non-anchor carriers.

In an eleventh example, the subject matter of example 1 or 7, or any of the examples herein, wherein the one or more processors are to: receive, via the RF interface, an Uplink (UL) carrier index that indicates that the one or more carriers includes an anchor carrier and one or more non-anchor carriers.

In a twelfth example, the subject matter of example 1 or 7, or any of the examples herein, wherein the one or more processors is to: select a carrier, corresponding to the PRACH resource, to receive a Msg2 of the PRACH procedure; select the carrier to communicate a Msg3 of the PRACH procedure; and select the carrier where Msg2 is received to receive a Msg4 or Msg3 retransmission of the PRACH procedure.

In a thirteenth example, a computer-readable medium may contain program instructions for causing one or more processors, associated with Narrowband-Internet-of-Things (NB-IoT) device, to: determine, based on a reference signal, a coverage level of the NB-IoT device; receive Reference Signal Received Power (RSRP) thresholds for a plurality of Physical Random Access Channel (PRACH) resources of one or more carriers; map the coverage level of the NB-IoT device to the PRACH resources based on the coverage level of the NB-IoT device and the RSRP thresholds; and when the coverage level of the NB-IoT device maps to multiple PRACH resources, randomly select the PRACH resource, from the multiple PRACH resources, to perform the PRACH procedure.

In example, 14, the subject matter of example 13, or any of the examples herein, wherein the one or more carriers includes an anchor carrier and one or more non-anchor carriers.

In example, 15, the subject matter of example 13, or any of the examples herein, wherein the one or more processors is to: receive, via the RF interface, selection probabilities for selecting a PRACH resource of the anchor carrier or a PRACH resource of a non-anchor carrier of the one or more non-anchor carriers; and randomly select the PRACH resource based on the selection probabilities.

In example, 16, the subject matter of example 15, or any of the examples herein, wherein the selection probabilities include: a first selection probability for selecting a PRACH resource from the anchor carrier or a PRACH resource of a non-anchor carrier of the one or more non-anchor carriers, and a second selection probability for selecting a PRACH resource from the one or more non-anchor carriers.

In example, 17, the subject matter of example 16, or any of the examples herein, wherein the second selection probability is equal to: one (1) minus the first selection probability, divided by a quantity of the multiple PRACH resources.

In example, 18, the subject matter of example 13, or any of the examples herein, wherein the RSRP thresholds are provided in one or more System Information Blocks.

In example, 19, the subject matter of example 13, or any of the examples herein, wherein the one or more processors is to: receive an Uplink (UL) carrier index that indicates that the one or more carriers include an anchor carrier and one or more non-anchor carriers.

In example, 20, the subject matter of example 13, or any of the examples herein, wherein the RSRP thresholds are received via a Physical Downlink Control Channel (PDCCH).

In example, 21, the subject matter of example 13, or any of the examples herein, wherein the one or more processors is to: select a carrier, corresponding to the PRACH resource, to receive a Msg2 of the PRACH procedure; select the carrier to communicate a Msg3 of the PRACH procedure; and select the carrier where Msg2 is received to receive a Msg4 or Msg3 retransmission of the PRACH procedure.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2 and 7-9 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A Narrowband-Internet-of-Things (NB-IoT) device, comprising:
    a radio frequency (RF) interface to RF circuitry; and
    one or more processors to:
        receive, via the RF interface, Reference Signal Received Power (RSRP) thresholds for a plurality of Physical Random Access Channel (PRACH) resources of one or more carriers;
        receive, via the RF interface, selection probabilities for selecting a PRACH resource of an anchor carrier or a PRACH resource of a non-anchor carrier of one or more non-anchor carriers;
        determine, based on a reference signal, received via the RF circuitry, a coverage level of the NB-IoT device;
        map the coverage level of the NB-IoT device to the PRACH resources based on the coverage level of the NB-IoT device and the RSRP thresholds; and
        when the coverage level of the NB-IoT device maps to multiple PRACH resources,
            randomly select the PRACH resource, based on the selection probabilities, from the multiple PRACH resources, to perform a PRACH procedure.

2. The NB-IoT device of claim 1, wherein the one or more carriers includes the anchor carrier and the one or more non-anchor carriers.

3. The NB-IoT device of claim 1, wherein the selection probabilities include:
    a first selection probability for selecting a PRACH resource from the anchor carrier or a PRACH resource of a non-anchor carrier of the one or more non-anchor carriers, and
    a second selection probability for selecting a PRACH resource from the one or more non-anchor carriers.

4. The NB-IoT device of claim 3, wherein the second selection probability is equal to:
    one (1) minus the first selection probability, divided by a quantity of the multiple PRACH resources.

5. The NB-IoT device of claim 1, wherein the RSRP thresholds are provided in one or more System Information Blocks.

6. The NB-IoT device of claim 1, wherein the one or more processors is to:
    receive an Uplink (UL) carrier index that indicates that the one or more carriers include the anchor carrier and the one or more non-anchor carriers.

7. The NB-IoT device of claim 1, wherein the RSRP thresholds are received via a Physical Downlink Control Channel (PDCCH).

8. The NB-IoT device of claim 1, wherein the one or more processors is to:
    select a carrier, corresponding to the PRACH resource, to receive a Msg2 of the PRACH procedure;
    select the carrier to communicate a Msg3 of the PRACH procedure; and
    select the carrier where Msg2 is received to receive a Msg4 or Msg3 retransmission of the PRACH procedure.

9. A computer-readable medium containing program instructions for causing one or more processors, associated with Narrowband-Internet-of-Things (NB-IoT) device, to:
    receive Reference Signal Received Power (RSRP) thresholds for a plurality of Physical Random Access Channel (PRACH) resources of one or more carriers;
    receive selection probabilities for selecting a PRACH resource of an anchor carrier or a PRACH resource of a non-anchor carrier of one or more non-anchor carriers;
    determine, based on a reference signal, a coverage level of the NB-IoT device;
    map the coverage level of the NB-IoT device to the PRACH resources based on the coverage level of the NB-IoT device and the RSRP thresholds; and
    when the coverage level of the NB-IoT device maps to multiple PRACH resources,
        randomly select the PRACH resource, based on the selection probabilities, from the multiple PRACH resources, to perform a PRACH procedure.

10. The computer-readable medium of claim 9, wherein the one or more carriers includes the anchor carrier and the one or more non-anchor carriers.

11. The computer-readable medium of claim 9, wherein the selection probabilities include:

a first selection probability for selecting a PRACH resource from the anchor carrier or a PRACH resource of a non-anchor carrier of the one or more non-anchor carriers, and a second selection probability for selecting a PRACH resource from the one or more non-anchor carriers.

12. The computer-readable medium of claim 11, wherein the second selection probability is equal to:

one (1) minus the first selection probability, divided by a quantity of the multiple PRACH resources.

13. An apparatus for a baseband processor of Narrowband-Internet-of-Things (NB-IoT) device configured to:

receive selection probabilities for selecting between a Physical Random Access Channel (PRACH) carrier resource of an anchor carrier and a PRACH carrier resource of one or more non-anchor carriers;

map the NB-IoT device to one or more PRACH carrier resources, of a plurality of carriers, based on a coverage level of the NB-IoT device and Reference Signal Received Power (RSRP) thresholds of the PRACH carrier resources;

determine, based on the selection probabilities, a probability for selecting a PRACH carrier resource of the anchor carrier and probabilities for selecting each PRACH carrier resource of the one or more non-anchor carriers, and when the coverage level of the NB-IoT device maps to multiple PRACH carrier resources, randomly select the PRACH carrier resource, based on the selection probabilities, from the multiple PRACH carrier resources, to perform a PRACH procedure.

14. The apparatus of claim 13, wherein the multiple PRACH carrier resources comprise the anchor carrier and the one or more non-anchor carriers.

15. The apparatus of claim 13, wherein:

the probability for selecting the PRACH carrier resource of the anchor carrier is equal to a first selection probability, and the probabilities for selecting each PRACH carrier resource is equal to: one (1) minus the first selection probability, divided by a quantity of the multiple PRACH resources.

16. The apparatus of claim 13, wherein the one or more processors are to:

receive an Uplink (UL) carrier index that indicates that the multiple PRACH carrier resources comprise the anchor carrier and the one or more non-anchor carriers.

17. The apparatus of claim 13, wherein the one or more processors is to:

select a carrier, corresponding to the PRACH resource, to receive a Msg2 of the PRACH procedure;

select the carrier to communicate a Msg3 of the PRACH procedure; and select the carrier where Msg2 is received to receive a Msg4 or Msg3 retransmission of the PRACH procedure.

18. A base station, the base station comprising:

a radio frequency (RF) interface to RF circuitry; and one or more processors to:

communicate, via the RF interface, Reference Signal Received Power (RSRP) thresholds for a plurality of Physical Random Access Channel (PRACH) resources of one or more carriers;

communicate, via the RF interface, selection probabilities for selecting a PRACH resource of an anchor carrier or a PRACH resource of a non-anchor carrier of one or more non-anchor carriers; and when a coverage level, associated with a Narrowband-Internet-of-Things (NB-IoT) device and the base station, corresponds to multiple PRACH resources, perform a PRACH procedure based on PRACH resources randomly selected, based on the selection probabilities, by the NB-IoT device.

19. The base station of claim 18, wherein the one or more carriers includes the anchor carrier and the one or more non-anchor carriers.

20. The base station of claim 18, wherein the selection probabilities include:

a first selection probability for selecting a PRACH resource from the anchor carrier or a PRACH resource of a non-anchor carrier of the one or more non-anchor carriers, and a second selection probability for selecting a PRACH resource from the one or more non-anchor carriers.

21. The base station of claim 20, wherein the second selection probability is equal to:

one (1) minus the first selection probability, divided by a quantity of the multiple PRACH resources.

22. The base station of claim 18, wherein the RSRP thresholds are provided in one or more System Information Blocks.

23. The apparatus of claim 18, wherein the one or more processors is to:

communicate an Uplink (UL) carrier index that indicates that the one or more carriers include the anchor carrier and the one or more non-anchor carriers.

24. The base station of claim 18, wherein the RSRP thresholds are communicated via a Physical Downlink Control Channel (PDCCH).

25. The base station of claim 18, wherein the one or more processors is to:

select a carrier, corresponding to the PRACH resource, to communicate a Msg2 of the PRACH procedure;

receive, via the carrier, a Msg3 of the PRACH procedure; and select the carrier, where Msg2 is received, to receive a Msg4 or Msg3 retransmission of the PRACH procedure.

* * * * *